United States Patent [19]

Pelzer

[11] Patent Number: 4,779,682
[45] Date of Patent: Oct. 25, 1988

[54] METHOD FOR THE GRIT-FREE WITHDRAWAL OF WATER FROM A WELL AND ALSO A DEVICE SUITABLE THEREFOR

[75] Inventor: Rudolf Pelzer, Herzogenrath, Fed. Rep. of Germany

[73] Assignee: Kabelwerk Eupen AG, Eupen, Belgium

[21] Appl. No.: 26,724

[22] PCT Filed: Jun. 10, 1986

[86] PCT No.: PCT/BE86/00017

§ 371 Date: Feb. 9, 1987

§ 102(e) Date: Feb. 9, 1987

[87] PCT Pub. No.: WO86/07408

PCT Pub. Date: Dec. 18, 1986

[30] Foreign Application Priority Data

Jun. 12, 1985 [BE] Belgium ............................ 0/215172

[51] Int. Cl.⁴ ..................... E21B 43/08; E21B 43/12
[52] U.S. Cl. ..................................... 166/370; 166/68; 166/69; 166/227; 166/228; 166/242; 210/170; 210/416.3; 210/497.01
[58] Field of Search ............. 166/51, 68, 69, 105, 166/227, 228, 232, 233, 236, 242, 269, 278, 369, 370; 210/170, 282, 289, 416.3, 497.01, 497.1, 747

[56] References Cited

U.S. PATENT DOCUMENTS

| 2,019,418 | 10/1935 | Lang | 166/269 |
| 4,014,387 | 3/1977 | Fink | 166/369 |
| 4,624,319 | 11/1986 | Van Der Borght | 166/369 |

FOREIGN PATENT DOCUMENTS

| 3005604 | 8/1981 | Fed. Rep. of Germany | 210/497.01 |
| 7712759 | 5/1979 | Netherlands | 166/242 |
| 0933952 | 6/1982 | U.S.S.R. | 166/369 |

Primary Examiner—George A. Suchfield
Attorney, Agent, or Firm—Pollock, VandeSande and Priddy

[57] ABSTRACT

In a well with filter tube and filter gravel fill a slot profile for a collection element forming the suction tube has larger suction cut-outs at the bottom than at the top and effects an equalization of the flow velocity of the water passing into the filter gravel layer on the basis of the combination of calculations and empirical investigations.

16 Claims, 3 Drawing Sheets

METHOD FOR THE GRIT-FREE WITHDRAWAL OF WATER FROM A WELL AND ALSO A DEVICE SUITABLE THEREFOR

The invention relates to a method for the grit-free withdrawal of water from a well and also to a device suitable for this purpose.

BACKGROUND OF THE INVENTION

A known method for the withdrawal of water uses a vertical double tube, uniformly provided with openings, via which water is drawn off by means of a subaqueous pump (or other withdrawal device). However, this method only provides a rather low withdrawal capacity if it is required that the water withdrawn shall be grit-free, i.e. if sand particles above a critical grain size are not also to be drawn off from the surrounding water-bearing stratum.

This method with the device, the so-called suction current collection (SCC), is known from German Offenlegungsschrift 2,401,327. According to the latter, the so-called collection element of the SCC consists of two coaxially disposed tubes of different diameter with uniform transverse slots over the variable length, the hollow cylindrical gap between the two tubes being filled with a fine-grain granulate. This construction is intended to achieve the result that the horizontal approach velocity at the critical point $R_K$ (FIG. 1) is approximately constant over the entire effective vertical length of the collection element, the so-called drainage length $L_E$. As measurements have shown, a uniform horizontal approach velocity over the entire drainage length cannot be achieved with the collection element known from German Offenlegungsschrift No. 2,401,327. For a uniform approach velocity at the critical point $R_K$ (FIG. 2) over the drainage length of the collection element this has the result that for a certain delivery rate a certain quantity of fine-grain sand particles is still entrained and consequently drawn off.

It is therefore the object of the invention to provide, for a certain delivery rate, a method for the grit-free withdrawal of water from a well and also an associated device, and in doing this at the same time to reduce further the energy consumption compared to conventional water delivery without SCC as a result of a still lower groundwater depression in the well area.

SUMMARY OF THE INVENTION

The measures provided according to the invention result in the particular advantage that a uniform flow profile over the drainage length is produced for a certain delivery rate at the point $R_K$ (FIG. 2) and consequently no sand particles above the critical grain size are drawn off. in addition, the drive power required for the pump used is lower than for the conventional SCC according to German Offenlegungsschrift No. 2,401,327 since the mean approach velocity in the water-bearing stratum is lower and the collection element consists only of a transversely slotted, thin-wall single tube with as large a diameter as possible, which tube therefore produces no appreciable loss in pressure in the radial direction across the wall.

According to an advantageous embodiment of the invention, a uniform flow profile at the point $R_K$ is achieved by keeping the product of the length element $\Delta x$, the flow velocity $V_{ssc(x)}$ into the slots in the wall of the collection element (slot velocity) and the relative, i.e. referred to the area of the length element $\Delta x$ of the SCC, water passage area (x) (relative slot area $\Delta$ slot factor) constant over the entire drainage length of the SCC. That is to say that the same partial water quantity $\Delta \overset{\circ}{V}$ flows radially into the SCC through each element of length $\Delta x$ of the drainage length $L_E$. In flow science terms this can be explained by the fact that the radial pressure drop across the SCC wall decreases in a specified manner from top to bottom, and consequently the flow velocity in the water passage areas which is proportional to this pressure drop also becomes correspondingly less from top to bottom. In order, therefore, to achieve delivery rate $\Delta \overset{\circ}{V}$=constant, the relative water passage area has therefore to become increasingly larger from top to bottom (FIG. 3).

An absolutely uniform flow profile at the point $R_K$ (FIG. 2) would theoretically result if the relative water passage area were to increase in specified manner in infinitesimally small steps from top to bottom. The only possibility of achieving this continuous slot area increase from top to bottom would theoretically be by a continuous longitudinal slot or a slot tangentially displaced in sections which increases in width in a specified manner continuously from top to bottom. Both the latter, and also a transverse slotting performed in infinitesimally small steps are virtually not achievable at justifiable expense for manufacturing reasons. However, it emerged in practical field trials that a uniform flow profile at the point $R_K$ over the drainage length can be achieved with a relative water passage area which increases in finite small steps. It is conceivable that the length $\Delta x$ of the individual steps can be chosen as small as desired and is only limited by manufacturing expense. At any event the step length $\Delta x$ represents a very small value in proportion to the overall drainage length $L_E$.

Particularly advantageous is the fact that, with the measures provided according to the invention for a certain delivery rate $\overset{\circ}{V}$ at the point $R_K$ (transition from water-bearing stratum to the filter-gravel layer), a flow velocity $v_K$ can be achieved which is smaller than the so-called entrainment velocity for critical sand particles (entrainment velocity: the critical flow velocity at which a sand grain of specified grain size is just set in motion). If, however, the flow velocity at this point is already lower than the entrainment velocity for critical sand particles, it is considerably still further below the entrainment velocity inside the water-bearing stratum as follows from the continuity theorem for line decline. Sand particles of critical grain size can therefore no longer be set in motion by the flow and be drawn off by the pump.

A further substantial advantage results from the uniform flow profile at the point $R_K$ achieved with the subject according to the invention and from the low average velocity $v_K$ associated therewith: since the flow losses in the water-bearing stratum substantially determine the so-called depression (difference in height $h_1$ between hydrostatic and operating water level in the bore-hole, FIG. 2), the depression is also correspondingly lowered as the flow velocity $v_K$ averaged over the drainage length $L_E$ is further reduced. This results in a still lower energy requirement for pumping the water compared with the conventional SCC.

For the transverse slotting the slot factor can be varied according to several possibilities: by means of the slot width (tangential extent), the slot height (axial extent) and the slot separation (axial spacing of the slots with respect to each other). Because of the varying degree of ovalness of the tubes practical difficulties arise in the case of the first possibility in relation to precisely maintaining the slot widths specified for each step and consequently the specified passage areas. In the case of the second possibility the manufacturing cost is particularly high because the height of the slots and consequently the thickness of the saw blades used varies from step to step. The third possibility of a variable slot separation is the least costly manufacturing technique and therefore forms the basis of the following exposition.

In the same way the slot factor can also be varied with a longitudinal slotting which is effectively identical but on which a natural limit is imposed by the slot width (in this case axial extent) in view of the fine gradation of the slot factor.

Further advantages, details and features of the invention are explained in more detail in the description given below of an exemplary embodiment of the invention with reference to the diagrammatic drawings.

DESCRIPTION OF THE PREFERRED EMBODIMENTS

Figure 1:
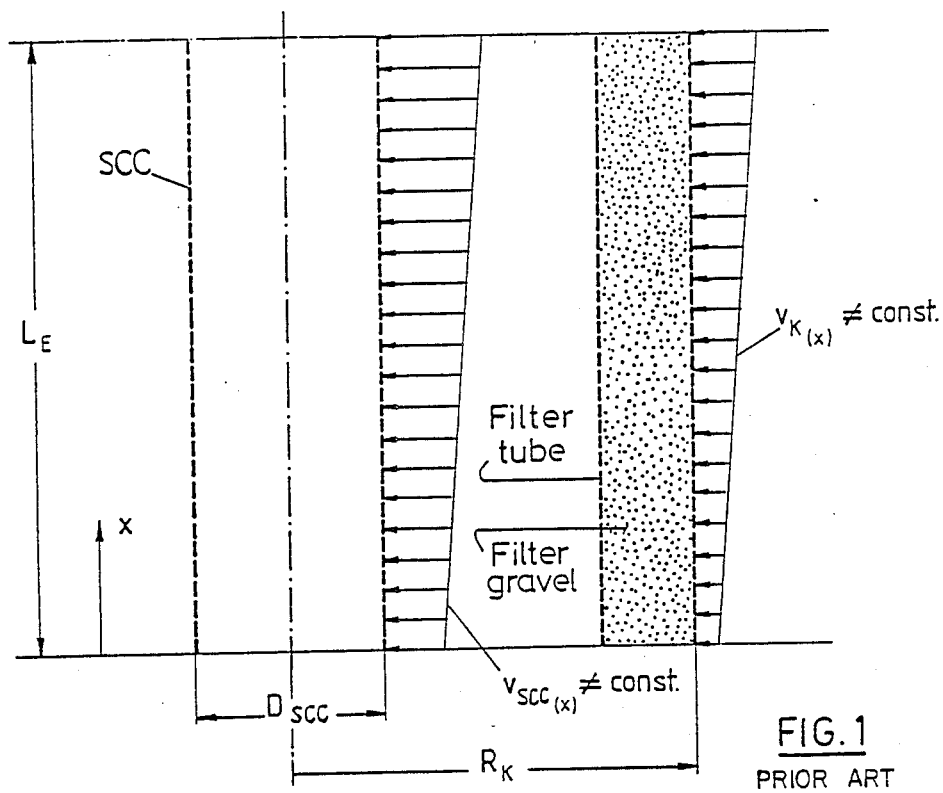
FIG. 1 shows the cross-sectional view of a conventional SCC which is in operation.

FIG. 1 shows the non-uniform flow distribution over the drainage length $L_E$ in the slots of the collection element, which must inevitably lead to an equally non-uniform flow distribution at the oint $R_K$ with a constant slot factor over the drainage length.

Figure 2:
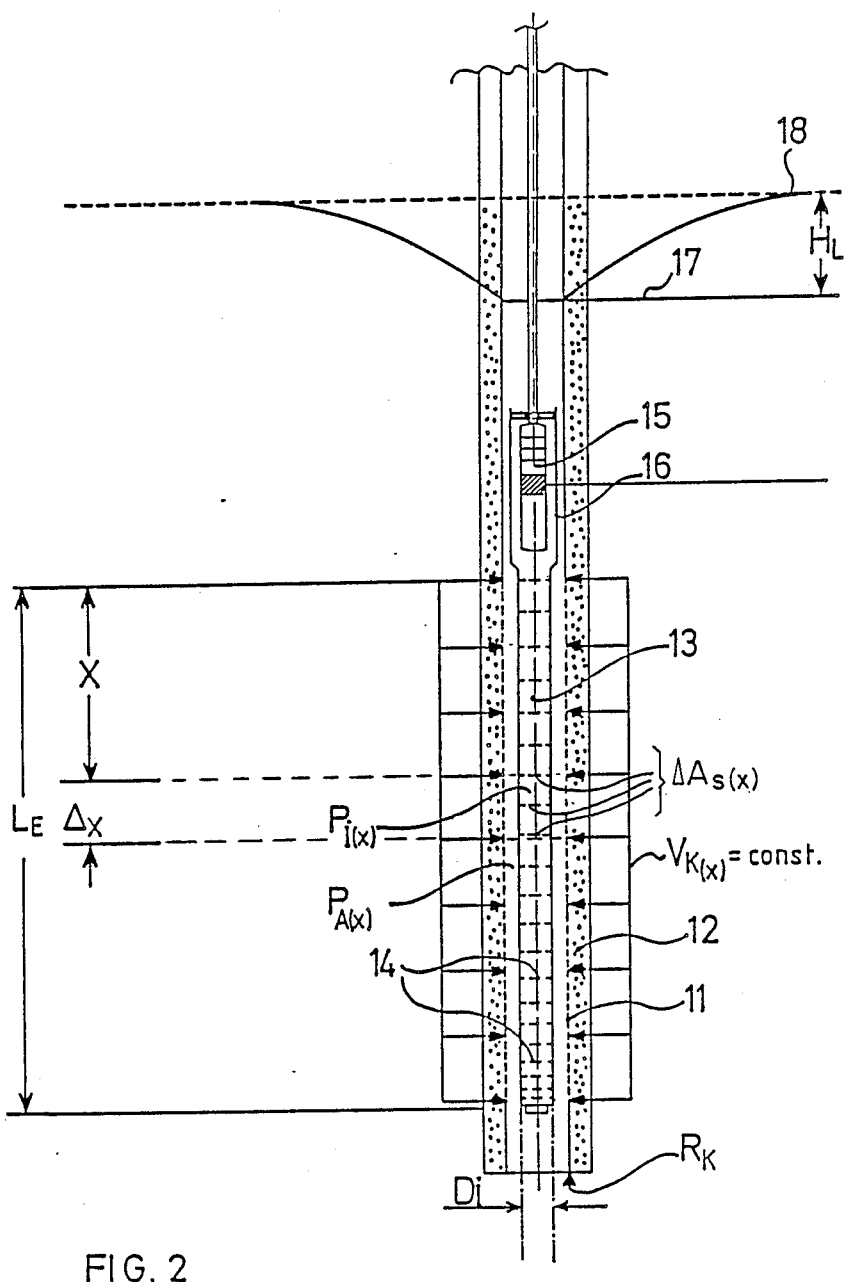
FIG. 2 shows the sectional view of an SCC according to the invention which is in operation.
Figure 4:
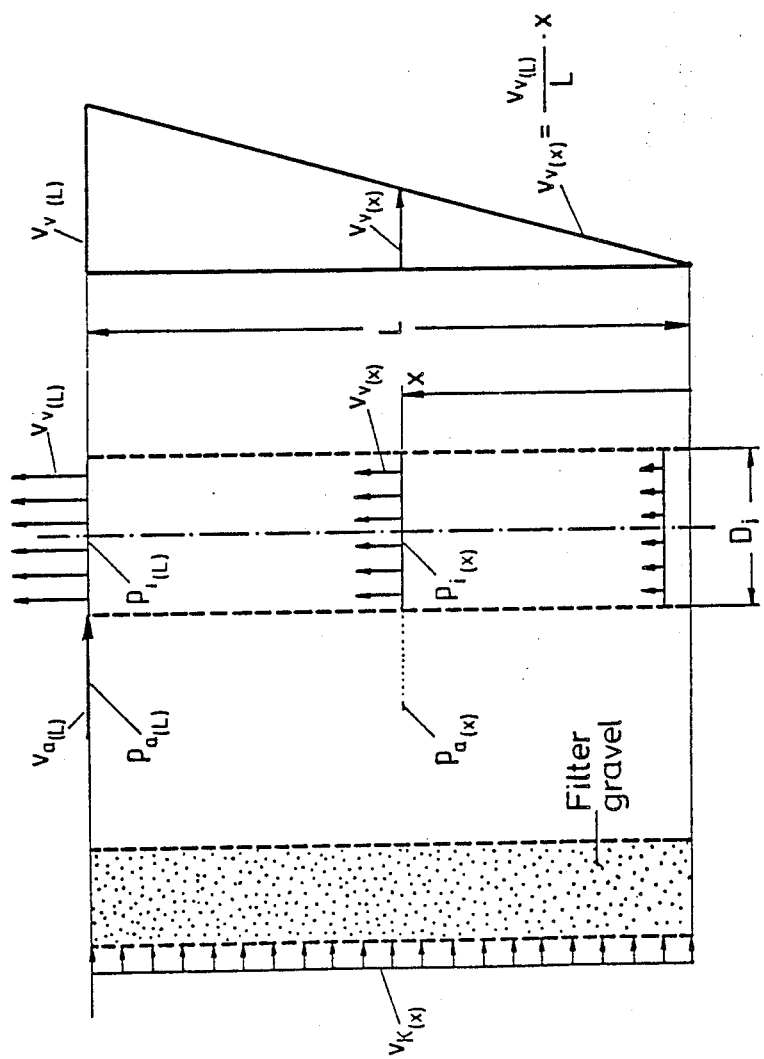

In FIG. 2 the flow relationships of a well equipped with the subject according to the invention are depicted. In the region of the water-bearing stratum the collection element 13 according to the invention is disposed within a well filter tube 11 surrounded by a filter-gravel fill 12.

The tube has a multiplicity of horizontal transverse slots 14 which are incorporated in the wall thereof as circular-segment slots in several rows uniformly over the circumference of the collection element 13. The vertical ridges in the wall left between the rows of slots ensure the overall solidity of the collection element 13. All the slot segments 14 have the same width, length and height. It is only the spacing of adjacent slots in the axial direction which decreases from top to bottom in accordance with the calculations set forth in detail below. The subaqueous pump 15 is enclosed by a continuous tube 16 to which the collection element 13 adjoins at the bottom and is so disposed in the wellhole that even at maximum suction power it is always below an operating water level denoted by 17. The latter lies below the hydrostatic water level 10 by the amount of the depression $H_L$.

The flow effect which is achieved with the subject according to the invention is derived mathematically below. According to the explanations cited above, at any randomly chosen point x there flows through an element of area $$\Delta A = \pi \cdot D_i \cdot \Delta x \tag{1}$$

the partial quantity $$\Delta \mathring{V} = \Delta A \cdot a_{(x)} \cdot V_{S(x)} = \text{const}; \tag{2}$$

here:

$D_i$ = the inside diameter of the collection element 13;
$a_{(x)} = \Delta A_{S(x)}/\Delta A$: the slot factor which is variable over the drainage length $L_E$;
$\Delta A_{S(x)}$ = the total slot area, which is dependent on x, in the element of area $\Delta A$;
$v_{SCC(x)}$ = the flow velocity in the slots, which is variable over the drainage length $L_E$.

In the SCC according to German Offenlegungsschrift No. 2,401,327, using a suitable construction of the SCC wall an attempt was made by artificially increasing the flow resistance to render $v_{SCC(x)}$ constant over the drainage length $L_E$. In this case it was also possible to keep $a_{(x)}$ constant over the drainage length $L_E$ in order to fulfil equation (2). Investigations performed within the scope of the invention showed, however, that the requirement $v_{SCC(x)}$=const is only inadequately fulfilled. The flow losses in the vertical direction in the inner tube of the SCC according to German Offenlegungsschrift No. 2,401,327 are by no means negligible compared with the radial flow resistances of the SCC wall with the result that flow losses which vary as a function of x arise along the individual flow filaments from the entry of the water into the slots of the SCC right up to the pump, which losses inevitably produce a non-uniform flow towards the control.

The conclusion to be drawn from this is that the desired effect can consequently be achieved only by a variable slot distribution over the drainage length $L_E$. This distribution can only be determined if the flow velocity $v_{SCC(x)}$ is known. The latter is therefore calculated below. According to the energy theorem, the following applies for flow which is subject to friction:

$$(1+\zeta)K v_{h(L)}^2 = p_{a(L)} - p_{i(L)} \tag{3}$$

Here $\zeta$ expresses the flow resistances of the slots 14 in the wall of the collection element 13. $\zeta$ depends on the slot shape and the wall thickness of the collection element 13 and is approximately 0.5 for thin-wall tubes. The constant $K=\gamma/2g$ is the quotient obtained from the specific gravity of the water and the acceleration due to gravity. $v_{h(L)}$ represents the horizontal flow velocity of the water in the slot at the point $x=L$. The vertical position of the collection element 13 is represented by the running coordinate x, the so-called running length, x being =0 at the lower end of the collection element 13 and x being =L at the upper end, i.e. pump end of the effective drainage length $L_E$ of the collection element 13. $P_a$ denotes the pressure outside the collection element 13 and $P_i$ the pressure inside the latter.

The following apply for the pressure $P_{a(x)}$ and $P_{i(x)}$:

$$p_{a(x)} = p_{a(L)} + \gamma(L-x) \tag{4}$$

$$p_{i(x)} = p_{i(L)} + \gamma(L-x) + \Delta p_{vv(x)} + \Delta p_{dynv(x)} \tag{5}$$

In these equations $\gamma(L-x)$ expresses the hydrostatic pressure difference between the points L and x, $\Delta p_{vv(x)}$ expresses the frictional losses of the vertical flow in the slotted tube from x to L and $\Delta p_{dynv(x)}$ expresses the dynamic pressure difference of the vertical flow in the slotted tube resulting from the acceleration of the water flow towards the upper tube end (x=L).

Since the equation (3) is valid not only for x=L but for any randomly chosen value of x, it can be rewritten as $$(1+\zeta)(\gamma/2g)v_h^2(x) = p_a(L) - p_i(L) - \Delta p_{dynv(x)} - \Delta p_{vv(x)}$$

Using equation (3) again and solving the resulting equation for $v_{h(x)}$ taking $\eta=0.5$, the horizontal flow velocity $v_{h(x)}$ is found to be $$v_{h(x)} = \sqrt{v_{h(L)}^2 - \frac{\Delta p_{vv(x)} - \Delta p_{dynv(x)}}{1,5\,K}} \quad (6)$$

To determine the distribution of the horizontal flow velocities in the slots over the drainage length it would therefore be necessary to calculate the pressure differences due to the frictional losses of the vertical flow $\Delta p_{vv(x)}$ in the interior of the collection element and those of the dynamic pressure differences $\Delta p_{dynv(x)}$. This cannot, however, be precisely represented in closed form since a resistance coefficient $\lambda$, which is normally a constant for specified tube currents and lengths, is dependent in the present case on x and the vertical volumetric flow in the interior of the collection element 13 which varies with x. This is due to the fact that on the one hand, for each element of length $\Delta x$ constant partial currents $\Delta \mathring{V}$ flow into the interior of the collection element 13 and, on the other hand, the intensity of the water which passes into the interior of the collection element 13 through the slots 14 and the flow surges of which produce turbulences in the vertical water flow and consequently an apparent wall roughness $\lambda$, is variable over the length x.

Accordingly, therefore, the vertical flow velocities in the interior of the collection element 13, and also the frictional losses, which are proportional to $\lambda$, increase as x increases.

Lengthy investigations which were carried out within the scope of the invention have shown that $\lambda$ has to be determined experimentally in each case for a collection element size and a specified delivery rate $\mathring{V}$.

By solving corresponding equations and transforming several times the following is obtained for $$\Delta p_{vv(x)} = \lambda \frac{K \cdot 16 \cdot \mathring{V}^2}{\pi^2 \cdot D_i^5 \cdot 3L^2}(L^3 - x^3) \quad (7)$$

After corresponding transformations the following is obtained for $\Delta p_{dynv(x)}$:

$$\Delta p_{dynv(x)} = \frac{K \cdot 16 \cdot \mathring{V}^2}{\pi^2 \cdot D_i^4}\left[1 - \left(\frac{x}{L}\right)^2\right] \quad (8)$$

If, for example, $\mathring{V}$ is set equal to 0.07 m³/s, $D_i$ to 0.25 m and L to 6 m, it emerges that $\Delta p_{dynv(x=0)} \approx 2.1 \cdot \Delta p_{vv(x=0)}$ if the averaged resistance coefficient $\lambda \approx 0.06$ is used over the collection element length L.

In order to obtain an optimum flow distribution it is then also necessary to specify what the ratio b of the horizontal flow velocities $v_h$ at the points x=0 and x=L shall be. In the slot nearest the pump, i.e. at x=L, the horizontal flow velocity $v_{h(x=L)}$ is clearly larger than in the slot at the lower end of the collection element at x=0, with the result that $v_{h(x=0)} < v_{h(x=L)}$ and consequently it may be assumed that b<1. Using (7) and (8) the following is therefore obtained from equation (6) for x=0:

$$v_{h(L)} = \frac{4 \cdot \mathring{V}}{\pi \cdot D_i^2} \sqrt{\left(\frac{\lambda \cdot L}{4,5 D_i} + 0,667\right)\frac{1}{1-b^2}} \quad (9)$$

Now that the maximum velocity $v_{h(L)}$ is known, the distribution of the horizontal flow velocities $v_{h(x)}$ over the running length x can also be determined by substituting the equations (7), (8) and (9) in equation (6). The following is then obtained:

$$v_{h(x)} = \frac{4\mathring{V}}{\pi D_i^2}\sqrt{\frac{1}{1-b^2}\left(\frac{\lambda \cdot L}{4,5 D_i} + 0,667\right) - \frac{\lambda(L^3 - x^3)}{4,5 D_i L^2} - \frac{1-\left(\frac{x}{L}\right)^2}{1,5}} \quad (10)$$

It is now intended to calculate the actual slot distribution below. As explained earlier, the assumption for the distribution of the slots 14 over the vertical running length x consists in the fact that the same quantity of water $\Delta \mathring{V}$ shall approach each partial element $\Delta x$. In determining the slot factor a(x) allowance should be made for the fact that the passage area of a slot which becomes hydraulically active is smaller than the geometric slot area. This is due to the constriction effect of the water jet passing into the respective slot 14 and is allowed for by a contraction index $\alpha$ which enters into the equation and which reduces the volumetric flow for an element of area under consideration correspondingly. The following thus applies:

$$\Delta \mathring{V} = \pi D_i \cdot \Delta x \cdot v_{h(x)} \cdot a(x) \cdot \alpha \quad (11)$$

Since the partial volumetric flow should be constant for any element of area considered, a direct dependence of the slot factor on the horizontal flow velocity is produced. The slot factor a(x) can now be calculated separately for any element of area considered. For example, in a collection element 13 having an effective drainage length $L_E$ of 3 m and 15 steps, the corresponding step length $\Delta x = 0.2$ m. The required 15 different slot factor values can therefore be determined without difficulty using equation (11). In particular, the ith slot factor is then:

$$a_i = \frac{\Delta \mathring{V}}{\alpha \cdot \pi \cdot D_i \cdot \Delta x \cdot v_{h(xi)}} \quad (12)$$

Figure 3:
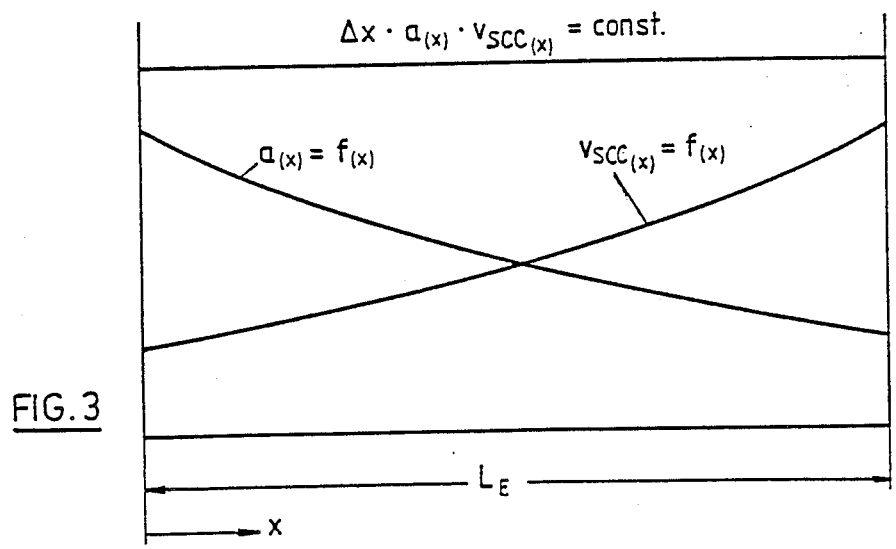
FIG. 3 shows the function curve of the slot factor $a_{(x)}$ and the slot velocity $v_{SCC(x)}$ over the drainage length $L_E$ and FIG. 4 shows the qualitative representation of the vertical flow velocity inside the control element over the drainage length $L_E$ as a function of x.

FIG. 3 shows both the slot velocity profile at the point $D_i$ for the horizontal flow velocity $v_{SCC(x)}$ and also the slot profile over the length of the collection element 13 plotted in diagrammatic form as they may be calculated using the above system of equations.

For the sake of clarity and easier intelligibility a calculated example may now be given at this point. The following values are assumed:
$\mathring{V}=0.06$ m³/s
$D_i=0.192$ m
$L=6$ m
$\lambda=0.06$
$v_{h(L)}=2.5$ m/s Whereas the resistance coefficient averaged over $L_E$ is taken as $\lambda=0.06$, the value for $v_{h(L)}$ corresponds approximately to the value determined experimentally. On solving equation (9) for b and after substituting the above numerical values, the following is obtained:
$b=0.506 \rightarrow v_{h(x=0)}=1.265$ m/s The horizontal slot flow velocity at the lower end is therefore about half as great as the horizontal flow velocity at the upper end of the collection element 13.

Equation (10) can be rewritten as $$v_{h(x)} = A\sqrt{B - C(L^3 - x^3) - D\left(1 - \frac{x^2}{L^2}\right)},$$

where the following abbreviations have been introduced:

$$A = \frac{4 \cdot \mathring{V}}{\pi \cdot D_i^2}$$

$$B = \frac{1}{1-b^2}\left(\frac{\lambda \cdot L}{4,5 \cdot D_i} + 0,667\right)$$

$$C = \frac{\lambda}{4,5 \cdot D_i L^2}$$

$$D = \frac{1}{1,5} = 0,667$$

After substituting the values of the numerical example, the following are obtained: $A=2.072$; $B=1.454$; $C=0.00193$. In the present numerical example $v_h$ can therefore be calculated as a function of the running length x in closed form for any randomly chosen value of x.

In order at this point to arrive at the slot profile, the step length $\Delta x$ of each calculation section must be specified. Although it would be possible also to choose any arbitrarily smaller gradation, it is, however, appropriate in the present example to choose $\Delta x = 0.4$ m, with the result that $L=15$, $\Delta x = 6$ m. For the quantity of water $\Delta \mathring{V}$ which has to be drawn off per step, the following then applies
$\Delta \mathring{V} = 0.06/15 = 0.004$ m³/s Equation (12) for the slot factor of the ith step can now be rewritten in the following manner:

$$a_i = E \cdot \frac{1}{v_{h(xi)}},$$

where for $\alpha \approx 0.6$ (rectangular inlet, see specialist literature)

$$E = \frac{\Delta \mathring{V}}{\pi \cdot D_i \cdot \Delta x \cdot \alpha}$$

and in the present example $E=0.0276$ m/s.

For strength reasons the individual slots are, as was explained earlier above, symmetrically divided up into several circular-segment slots disposed in vertical rows between which solid bridges extend as part of the wall of the collection element 13. The area of a slot $A_{S(1)}$ can therefore be expressed as $$A_{S(1)} = \beta \cdot \pi \cdot D_i \cdot s,$$

where s denotes the slot height and in the present numerical example is chosen to be $s=1$ mm. $\beta$ is the ratio of the total length of all the circular-segment slots located at a height x to the circumference of the collection element and is here taken as 0.6. Consequently the following results:
$A_{S(1)} = 0.000362$ m²
and the number Z of the slots (not to be confused with the number of circular-segment slots) per area of a step length $\Delta x$ is $$Z = \frac{a(x)}{A_{S(1)}} \left[\frac{1}{m^2}\right].$$

The slot pattern calculated for the above numerical example is evident from the following table.

| x | $v_{h(x)}$ | $a(x) = \frac{E}{v_{h(x)}}$ | $Z = \frac{a(x)}{A_{S(1)}}$ | |
|---|---|---|---|---|
| 0.2 | 1.26 | 0.02187 | 60.5 | bottom |
| 0.6 | 1.2726 | 0.0217 | 60 | |
| 1.0 | 1.273 | 0.0213 | 59 | |
| 1.4 | 1.3295 | 0.021 | 58 | |
| 1.8 | 1.377 | 0.02 | 55 | |
| 2.2 | 1.436 | 0.0192 | 53 | |
| 2.6 | 1.5074 | 0.0183 | 50.5 | |
| 3.0 | 1.53 | 0.0174 | 48 | |
| 3.4 | 1.6835 | 0.0164 | 45 | |
| 3.8 | 1.787 | 0.0155 | 43 | |
| 4.2 | 1.9 | 0.0145 | 40 | |
| 4.6 | 2.02 | 0.0137 | 38 | |
| 5.0 | 2.15 | 0.013 | 36 | |
| 5.4 | 2.28 | 0.0121 | 33.5 | top |
| 5.8 | 2.43 | 0.0114 | 31.5 | |

Preferably 4 to 6 slot rows of circular-segment slots are provided distributed over the circumference.

The newly developed method is applicable in a similar manner and with a similar effect also directly to well filter tubes: instead of a conventional well filter tube the bore-hole is lined with a slotted tube of the new constructional type in the region of the water-bearing strata, i.e. the water passage area increases in this well filter tube in the region in question from top to bottom in a specified manner. In this case the well construction is completely conventional, i.e. around the novel well filter tube filter gravel is packed in the conventional manner, a continuous well tube of conventional construction adjoins the novel well filter tube in the upwards direction and the subaqueous pump is installed without being provided with SCC in a manner such that its bottom edge lies exactly in the plane of the welding joint between the continuous well tube and the filter tube. The desired uniform flow profile will likewise already be present at the transition point $R_K$ from the aquifer, i.e. from the water-bearing strata, to the gravel fill.

According to a further advantageous embodiment of the invention an additional outer tube is provided which surrounds the collection element 13. The outer tube has a multiplicity of relatively large-area slots so that the relative water passage area of the outer tube is considerably greater than that of the collection element 13. A ratio of from 10 to 15:1 for the relative water passage areas of the outer tube and the collection element has proved to be particularly suitable.

With this additional outer tube the uniformity of the water flow in the region of the well filter tube can be improved still further with the result that a flow which approximates still further to laminar flow is established.

I claim:

1. Method for the withdrawal of degritted water from a well in which a device is used which has a collection element having a top and a bottom, said collection element being a single-wall tube having a solid wall surface provided with openings or slots constituting water passage areas for the passage of water from the well and into the collection element at a velocity, and a subaqueous pump which is disposed in a tube connected to the collection element, the method comprising the steps of drawing water into the collection element; and increasing the share of said water passage areas compared with the share of the solid wall surface of the collection element over the total area spanned by the collection element from top to bottom of the collection element such that the water is drawn substantially horizontally into the collection element, and further such that the water quantity delivered to the collection element is maintained substantially constant over the total area spanned by the collection element.

2. Method according to claim 1 further comprising the step of increasing the water passage area of the collection element sectionwise per unit of length thereof by dividing the total length of the collection element into partial pieces for which, from the top to the bottom of each respective partial piece, the water passage area is increased.

3. Method according to claim 2 further comprising the step of maintaining a constant partial water quantity passing into each respective partial piece over the total length of the collection element, such that the partial water quantity which is formed per partial piece of the collection element from the relative water passage area is substantially equal for every partial piece of the collection element.

4. Method according to claim 2 wherein the water passage area $a_1$ provided for each partial piece is $$a_i = \frac{\Delta \dot{V}}{\pi \cdot D_i \cdot \Delta x \cdot v_{h(xi)} \cdot \alpha}$$

where:

$a_i$ denotes the relative water passage area of any ith partial piece or section of length of the collection element, i represents the associated sequential number, $\dot{V}$ is the total delivery or suction rate of the collection element, $\Delta \dot{V}$ is the partial delivery rate for the partial piece $\Delta x_i$, $\Delta x$ is the height of a partial piece, $D_i$ is the inside diameter of the collection element, $v_{h(xi)}$ is the mean flow velocity through the water passage areas of the ith partial piece $\Delta x_i$ and $\alpha$ is a contraction index which is dependent on the construction of the slots or openings and which is approximately 0.6.

5. Method according to claim 4 wherein the number Z of slots or openings for the ith partial piece $\Delta x_i$ is $$Z = a_i / A_{S(1)}$$

where $A_{S(1)}$ represents the effective area of a slot or of an opening.

6. Method according to one of claims 1 or 2, including the step of constructing the collection element with as thin walls as possible to reduce the flow resistance through the openings or slots.

7. Method according to one of claims 1 or 2 further comprising the step of constructing the diameter of the collection element as large as possible to reduce the inner axial flow losses of the collection element.

8. Method for the withdrawal of degritted water from a conventionally constructed well in which a suitably positioned subaqueous pump and continuous well filter tube are used, comprising the steps of forming slots in the well filter tube in the region of the water-bearing strata, such that the share of the water passage area in successive partial areas of the well filter tube increases either substantially continuously or stepwise from top to bottom; and drawing water into the well filter tube substantially horizontally along substantially the entire length thereof, the partial water quantities that are respectively drawn into said partial areas of the tube being substantially equal to one another.

9. Device for the withdrawal of a flow medium, in particular water, from a reservoir, in particular from a well, comprising:

a tube having a top end and a bottom end, the tube having a wall and an interior, said wall of the tube having cutouts formed therein so that the flow medium can pass into the interior of the tube;

a pump which is disposed in a casing connected to the top end of the tube at a draw off point which lies below the working level of the flow medium;

the tube being constructed as a single-wall collection element, the share of the area of the cut-outs formed in the collection element relative to the area of the wall of the tube increasing from the top to the bottom of the tube.

10. Device for the withdrawal of water from a well comprising:

a well filter tube positioned in the region of water-bearing strata, said tube having a top end and a bottom end and further having cut-outs areas formed therein through which the water can pass into the interior of the well filter tube;

a continuous well tube connected at one end thereof to the top end of the well filter tube;

a pump disposed at an end of the interconnected continuous well tube and the well filter tube, said pump having a draw-off point which lies below the working level of the water, the area of the cut-outs in the well filter tube increasing continuously or stepwise from the top to the bottom of the well filter tube.

11. Device according to one of claims 9 or 10 comprising an outer tube positioned in surrounding relation to the collection element or the well filter tube, said outer tube having cut-outs formed therein which have an area that is considerably larger than the area of the cut-outs formed in the collection element or the well filter tube, the cut-outs of the collection element or well filter tube being distributed uniformly over the length of the collection element or the well filter tube, whereby the outer tube functions as a flow equalizer.

12. A method for the production of degritted fluid from a reservoir having gritted fluid therein, comprising the steps of:
- horizontally withdrawing a quantity of gritted fluid from the reservoir;
- horizontally passing the quantity of withdrawn fluid, through a fluid passage area and into a collection area having a top and a bottom, in such manner that the fluid passes horizontally into the collection area over the entire length thereof;
- vertically withdrawing the fluid from the collection area; and
- controlling the passage of the fluid into the fluid passage area over the entire length thereof by increasing the size of the fluid passage area from the top to the bottom of said collection area over the entire length of said fluid passage area.

13. A method for the withdrawal of degritted fluid from a reservoir having gritted fluid therein by means of a subaqueous pump, a gravel pack surrounding the pump, and a suction collection device having a defined suction length, the suction length including a top and a bottom, the collection device further having a plurality of water passage areas formed therein over the entire suction length, said method comprising the steps of:
- using the pump to withdraw gritted fluid from the reservoir through the gravel pack whereby a quantity of gritted fluid is withdrawn from the reservoir;
- orienting the flow of the withdrawn fluid substantially horizontally through the gravel pack and into the suction collection device along the entire length thereof; and
- controlling the passage of the withdrawn fluid into the suction collection device by increasing, from the top to the bottom of the suction collection device, the sizes of the water passage areas formed therein.

14. A method for the withdrawal of degritted water from a well in which the water is collected from water bearing strata by means of a subaqueous pump drawing the water through a well screen having a defined suction length including a top, a bottom and water passage areas therebetween for the passage of the water into the well screen, and a surrounding gravel pack, comprising the steps of:
- forming water passage areas along the suction length with an increasingly large share of said water passage areas being formed from the top to the bottom thereof;
- maintaining a constant flow rate of the collected water over the entire suction length; and
- horizontally orienting the flow of water during the passage of said water through the gravel pack and the well screen.

15. A device for the withdrawal of degritted fluid from a reservoir having gritted fluid therein, comprising;
- a pump; and
- an elongated collection tube connected to said pump, said collection tube having a top and a bottom, said tube further having a plurality of water passages formed therein, the share of water passages formed in the collection tube increasing from the top to the bottom of said tube over the entire length of said tube.

16. A collection tube for removing degritted fluid from a reservoir having gritted fluid therein, said tube comprising:
- a tube wall having a top, a bottom, and a suction length therebetween; and
- said tube wall further having a plurality of water passage areas formed therein over the entire length thereof, the share of water passage areas formed in the tube being increasingly larger from the top to the bottom thereof.

* * * * *